United States Patent
Kawaguchi et al.

(10) Patent No.: US 10,768,275 B2
(45) Date of Patent: Sep. 8, 2020

(54) ANTENNA APPARATUS

(71) Applicants: DENSO CORPORATION, Kariya, Aichi-pref. (JP); SOKEN, INC., Nisshin, Aichi-pref. (JP)

(72) Inventors: Kazushi Kawaguchi, Nisshin (JP); Kazumasa Sakurai, Nisshin (JP); Toshiya Sakai, Nisshin (JP); Asahi Kondo, Kariya (JP)

(73) Assignees: DENSO CORPORATION, Kariya, Aichi-Pref. (JP); SOKEN, INC., Nishio, Aichi-Pref. (JP)

(*) Notice: Subject to any disclaimer, the term of this patent is extended or adjusted under 35 U.S.C. 154(b) by 72 days.

(21) Appl. No.: 16/091,252

(22) PCT Filed: Apr. 6, 2017

(86) PCT No.: PCT/JP2017/014397
§ 371 (c)(1),
(2) Date: Oct. 4, 2018

(87) PCT Pub. No.: WO2017/175835
PCT Pub. Date: Oct. 12, 2017

(65) Prior Publication Data
US 2019/0302225 A1    Oct. 3, 2019

(30) Foreign Application Priority Data
Apr. 6, 2016    (JP) ................. 2016-076823

(51) Int. Cl.
*G01S 7/03*    (2006.01)
*G01S 13/931*    (2020.01)
(Continued)

(52) U.S. Cl.
CPC .............. *G01S 7/03* (2013.01); *G01S 13/931* (2013.01); *H01Q 9/0407* (2013.01);
(Continued)

(58) Field of Classification Search
CPC ....... G01S 7/03; G01S 13/931; H01Q 9/0407; H01Q 15/14; H01Q 21/06; H01Q 21/065
See application file for complete search history.

(56) References Cited

U.S. PATENT DOCUMENTS

2010/0035370 A1*   2/2010   Ding ................. H01Q 1/40
                                              438/29
2010/0039343 A1*   2/2010   Uno ................. H01Q 3/24
                                              343/818

(Continued)

FOREIGN PATENT DOCUMENTS

JP    2011-193345 A    9/2011

OTHER PUBLICATIONS

Chamok et al., A Broadband UHF Antenna on a Non-Uniform Aperiodic (NUA) EBG Surface, IEEE, 2013, pp. 268-269.

*Primary Examiner* — Dao L Phan
(74) *Attorney, Agent, or Firm* — Maschoff Brennan

(57) ABSTRACT

An antenna apparatus includes a dielectric substrate, a base plate, an antenna unit, and a reflecting unit. A plurality of conductor patches are structured to resonate, at an operating frequency of the antenna unit, in a resonating direction which is different from a polarization direction Dan of a radio wave transmitted and received by the antenna unit.

20 Claims, 24 Drawing Sheets

(51) Int. Cl.
*H01Q 9/04* (2006.01)
*H01Q 15/14* (2006.01)
*H01Q 21/06* (2006.01)

(52) U.S. Cl.
CPC ............. *H01Q 15/14* (2013.01); *H01Q 21/06* (2013.01); *G01S 2013/93275* (2020.01)

(56) References Cited

U.S. PATENT DOCUMENTS

| | | | |
|---|---|---|---|
| 2012/0044113 A1* | 2/2012 | Satoh | H01Q 1/06 343/702 |
| 2015/0311591 A1* | 10/2015 | Golombek | H01Q 1/48 343/848 |
| 2015/0378006 A1 | 12/2015 | Ishida et al. | |
| 2018/0358710 A1* | 12/2018 | Toyao | H01P 1/30 |

\* cited by examiner

NORMAL SUBSTRATE

FIG.10

|  | Bα0<br>Bβ0 | Bα1<br>Bβ1 | Bα2<br>Bβ2 | Bα3<br>Bβ3 | Bα4<br>Bβ4 | Bα5<br>Bβ5 | Bα6<br>Bβ6 |
|---|---|---|---|---|---|---|---|
| COMPARATIVE EXAMPLE 1 (NORMAL SUBSTRATE) | 0 | 0 | 0 | 0 | 0 | 0 | 0 |
| EXAMPLE 2, 3 EQUAL PHASE DIFFERENCE 100deg | 0 | 100 | 200 | 300 | 400 | 500 | 600 |

FIG.11

PHASE [deg] AND SIZE [mm] OF ONE SIDE OF PATCH IN REFERENCE TO Bβ0

| | | Bβ0 | Bβ1 | Bβ2 | Bβ3 | Bβ4 | Bβ5 | ...... |
|---|---|---|---|---|---|---|---|---|
| COMPARATIVE EXAMPLE 1 : NORMAL SUBSTRATE WITH NO PHASE DIFFERENCE | PHASE | 0 | 0 | 0 | 0 | 0 | 0 | ...... |
| | SIZE | 2.3 | 2.8 | 2.95 | 3.2 | 2.8 | 3.1 | ...... |
| EXAMPLE 4 : EQUAL PHASE DIFFERENCE 30deg | PHASE | 0 | 30 | 60 | 90 | 120 | 150 | ...... |
| | SIZE | 2.3 | 2.8 | 2.95 | 3.2 | 2.8 | 3.1 | ...... |
| EXAMPLE 5 : EQUAL PHASE DIFFERENCE 60deg | PHASE | 0 | 60 | 120 | 180 | 240 | 300 | ...... |
| | SIZE | 2.7 | 2.85 | 2.95 | 3.05 | 3.2 | 2.7 | ...... |
| EXAMPLE 6 : EQUAL PHASE DIFFERENCE 90deg | PHASE | 0 | 90 | 180 | 270 | 360 | 450 | ...... |
| | SIZE | 2.8 | 2.95 | 3.1 | 2.3 | 2.85 | 3 | ...... |
| EXAMPLE 7 : PHASE DIFFERENCE INCREMENTS 30deg | PHASE DIFFERENCE | 0 | 30 | 90 | 180 | 300 | 450 | ...... |
| | SIZE | 2.3 | 2.8 | 2.95 | 3.2 | 2.8 | 3.1 | ...... |

EQUAL PHASE DIFFERENCE
(CORRESPONDING TO REFLECTION FROM PLANAR REFRACTING SUBSTRATE)

INCLINED PHASE DIFFERENCE
(CORRESPONDING TO REFLECTION FROM CURVED SUBSTRATE)

ANTENNA APPARATUS

CROSS REFERENCE TO RELATED APPLICATION

This application in a U.S. National Phase Application under 35 U.S.C. 371 of the International Application PCT/JP2017/014397 filed on Apr. 6, 2017 and published in Japanese as No. WO 2017/175835 on Oct. 12, 2017. This application is based on and claims the benefit of priority from Japanese Application No. 2016-76823 filed on Apr. 6, 2016. The entire disclosure of the above application is incorporated herein by reference.

TECHNICAL FIELD

The present disclosure relates to an antenna apparatus installed in an environment where radio waves are reflected.

BACKGROUND ART

A patch antenna formed on a dielectric substrate is used for a radar or the like provided in a mobile body such as a vehicle or an airplane to monitor surroundings thereof. The patch antenna is provided with a radiating element including a patch-like pattern formed on one surface of the dielectric substrate and a base plate formed on the other surface of the substrate.

If the patch antenna is used as an antenna for an on-vehicle radar apparatus, for example, the patch antenna may be mounted in a bumper of the vehicle. In this case, it is known that, a portion of a radio wave radiated from the antenna is reflected at an inner wall of the bumper and further re-reflected at a radiating surface of the antenna, and the re-reflected wave interferes with the radiated wave and affects radiation characteristics of the antenna.

PTL 1 listed below discloses an electromagnetic-wave reflecting surface of a planar substrate structure including a substrate having a base plate formed on one surface thereof and a plurality of conductor patches and connection elements all provided on the other surface of the substrate. The conductor patches are arrayed at predetermined intervals and the connection elements electrically connect the conductor patches together. The use of the electromagnetic-wave reflecting surface allows a wave front of a reflected wave reflected at the electromagnetic-wave reflecting surface to be inclined. This inclination of the reflected wave is achieved by configuring the connection elements based on an increase or decrease in the capacitance or the inductance, according to an arranged position of the conductor patches along one desired direction. That is, reflection of an electromagnetic wave can be oriented to a desired direction.

CITATION LIST

[Patent Literature]
PTL 1: Japanese Patent Laid-Open No. 2011-193345
In the above-described patch antenna, the above-described electromagnetic-wave reflecting surface may be formed around the radiating element such that the reflected wave from the bumper is re-reflected in a direction different from the direction in which the radiated wave travels. Consequently, possible interference caused by the reflected wave is suppressed in the radiating direction, corresponding to a main beam. On the other hand, the inventor's detailed examination has resulted in finding of formation of a strong beam different from the main beam in a reflecting direction of the re-reflected wave from the antenna reflecting surface, causing erroneous detection of a target.

An aspect of the present disclosure can desirably provide an antenna apparatus capable of sufficiently suppressing adverse effects of a reflected wave even if the antenna apparatus is installed in an environment where radio waves are reflected.

SUMMARY

An aspect of the present disclosure is an antenna apparatus mounted in a bumper, including a dielectric substrate, a base plate, an antenna unit, and a reflecting unit. The base plate is provided on a first surface of the dielectric substrate and serves as an antenna ground surface. The antenna unit is provided on a second surface of the dielectric substrate, and has an antenna pattern configured to serve as an antenna array. The reflecting unit is arranged around the antenna unit, and includes a plurality of conductor patterns serving as a reflector. Each of the plurality of conductor patterns included in the reflecting unit has a size smaller than an effective wavelength at a preset operating frequency of the antenna unit and is structured to resonate in a resonating direction different from a polarization direction of a radio wave transmitted and received by the antenna unit.

According to an aspect of the present disclosure, the plurality of conductor patterns included in the reflecting unit are structured to resonate in the resonating direction different from the polarization direction of the radio wave transmitted and received by the antenna unit. Thus, a reflected wave reflected by the reflecting unit corresponds to a polarized wave polarized in a direction different from the polarization direction in the antenna unit. Therefore, if a radiated wave radiated from the dielectric substrate surface is reflected in the radiating direction and arrives at and re-reflected by the reflecting unit, possible interference between the radiated wave and the re-reflected wave can be suppressed even when the direction of the re-reflection is equal to the direction of the radiation. Therefore, even if the antenna apparatus is installed in an environment where radio waves are reflected, the adverse effects of the reflected wave can be sufficiently suppressed.

Parenthesized reference numerals in the claims indicate correspondence relations with specific means described in embodiments discussed below as one aspect, and are not intended to limit the technical scope of the present disclosure.

BRIEF DESCRIPTION OF THE DRAWINGS

FIG. 10 is a table showing the phase of a reflected wave from each block in the first example and a third example of the second embodiment;

FIG. 11 is a table showing the phase of a reflected wave from each block and the size of the corresponding conductor patch in the third example of the second embodiment;

DESCRIPTION OF THE EMBODIMENTS

Embodiments of the present disclosure will be described below with reference to the drawings.

First Embodiment

<1. Configuration>

An antenna apparatus 1 is used for a millimeter-wave radar configured to detect various targets present around a vehicle, and is mounted in a bumper of the vehicle. The bumper of the vehicle is formed of a material that transmits radio waves, for example, resin.

Figure 1:
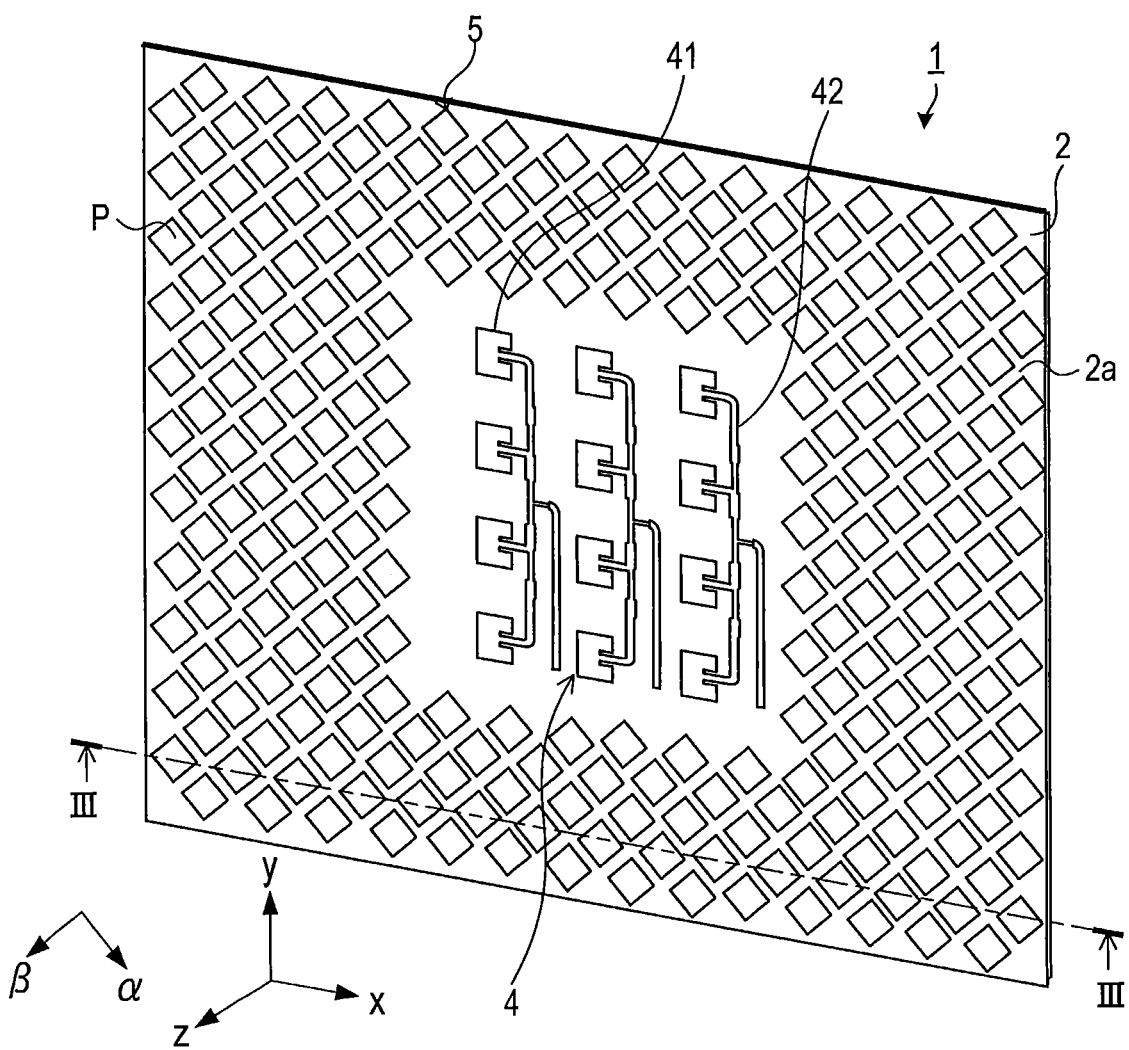
FIG. 1 is a perspective view of an x-y plane corresponding to a front surface of an antenna apparatus according to a first embodiment.
Figure 2:
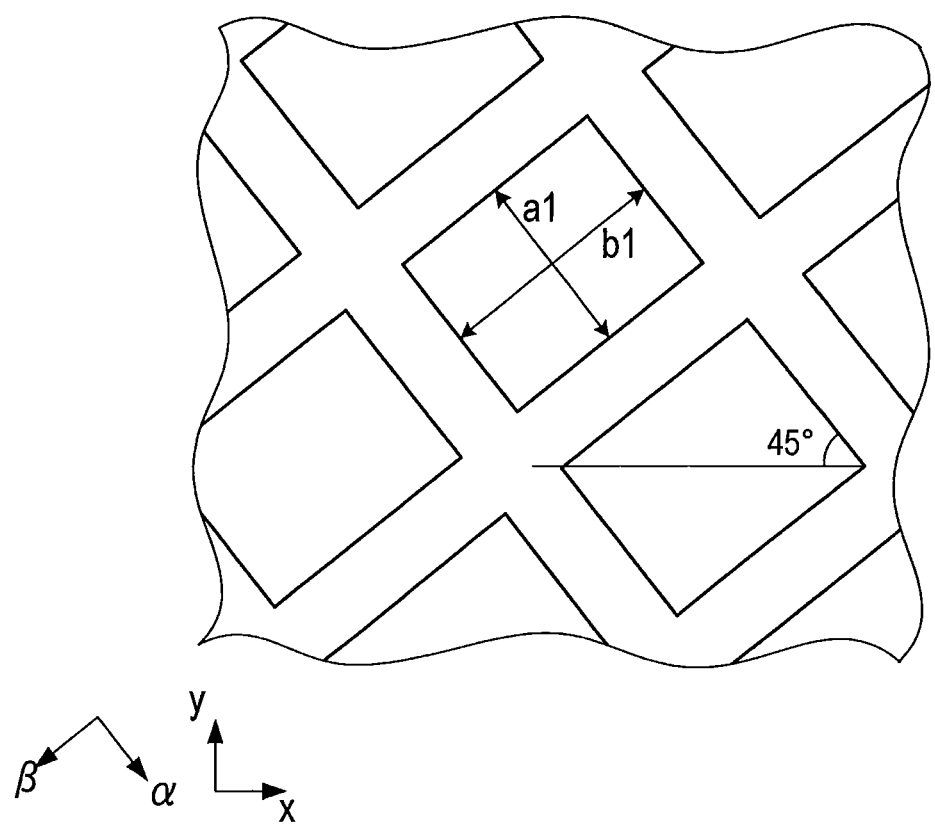
FIG. 2 is an enlarged view of a part of the x-y plane illustrated in FIG. 1.
Figure 3:
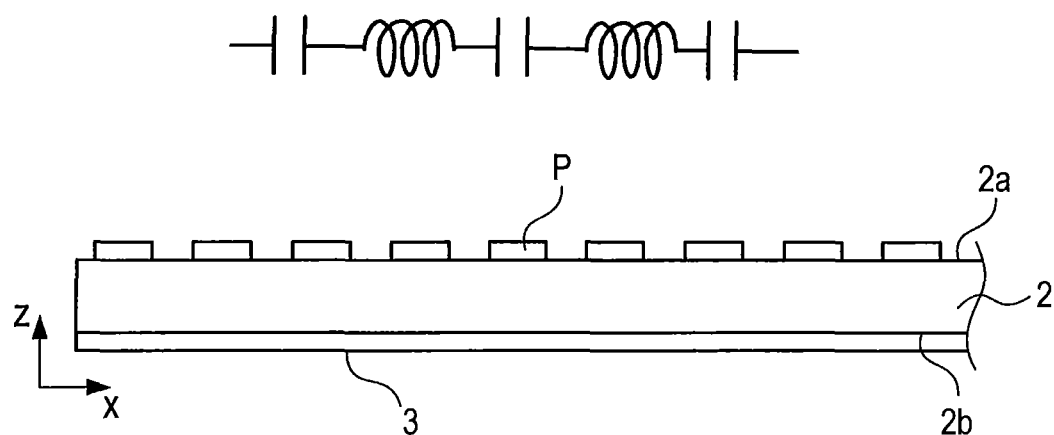
FIG. 3 is a cross-sectional view of the antenna apparatus taken along line III-III.

The antenna apparatus 1 is formed from a copper pattern provided on a rectangular dielectric substrate 2 as illustrated in FIGS. 1 to 3. One surface of the dielectric substrate 2 is hereinafter referred to as a substrate front surface 2a. The other surface of the dielectric substrate 2 is hereinafter referred to a substrate back surface 2b. A direction along one side of the dielectric substrate 2 is hereinafter referred to as an x-axis direction. A direction along another side of the dielectric substrate 2 orthogonal to the x-axis direction is hereinafter referred to as a y-axis direction. A normal direction of the substrate front surface is hereinafter referred to as a z-axis direction.

The substrate back surface 2b has a base plate 3 formed from a copper pattern covering the entire back surface 2b. An antenna unit 4 is formed near the center of the substrate front surface 2a. A reflecting unit 5 is formed around the antenna unit 4. The substrate back surface 2b is hereinafter also referred to as a radiating surface 2a.

The antenna unit 4 is provided with a plurality of array antennas arrayed along the x-axis direction. Each of the array antennas is provided with a plurality of rectangular patch antennas 41 arranged along the y-axis direction and feed lines 42 through which electricity is fed to each of the patch antennas 41. The antenna unit 4 is configured such that a polarization direction (hereinafter referred to as a polarization direction Dan) of radio waves transmitted and received by the antenna unit 4 coincides with the x-axis direction.

As illustrated in FIG. 2, the reflecting unit 5 is configured by two-dimensionally arranging rectangular conductor patches P including copper patterns. All of the conductor patches P are arranged such that two adjacent sides of each conductor patch P are inclined at 45 deg to the polarization direction Dan. In the following description, an a direction refers to the direction of one of the two adjacent sides of the conductor patch P, and a β direction refers to the direction of the other side of the conductor patch P. In the present embodiment, all the conductor patches P in the reflecting unit 5 are formed to have the same shape and the same size, and all intervals between the conductor patches P are formed to have the same length. Each of the conductor patches P is a parasitic element. Each conductor patch P is shaped like a rectangle. The size a1 of each short side of the rectangle and the size b1 of each long side thereof are set smaller than an effective wavelength $\lambda_O$ at an operating frequency $f_O$ of the antenna unit 4. Specifically, the size a1 and the size b1 are each set smaller than or equal to three-quarters of the effective wavelength $\lambda_O$. For example, the size a1 and the size b1 are set to 2.6 mm and 3.3 mm, respectively, at an operating frequency $f_O$=24.15 GHz.

In the reflecting unit 5, each conductor patch P has an inductance component, and the gap between the conductor patches P has a capacitance component. In other words, as illustrated in FIG. 3, the reflecting unit 5 is represented by an equivalent circuit including a plurality of series circuits LC each including inductances and capacitances and connected together in an a direction and a β direction. The inductance component and the capacitance component cause phase lag and phase lead, respectively, with respect to a current flowing over the radiating surface 2a.

Furthermore, in the reflecting unit 5, electric resonance occurs in the directions along the sides of each conductor patch P. The reflecting unit 5 is configured such that the series circuits LC are resonated at the operating frequency $f_O$ by adjusting the size of at least one of the conductor patch P and the gap in one of the a direction and the β direction. That is, an angle θr between the polarization direction Dan and a resonating direction of the reflecting unit 5 at the operating frequency $f_O$ is 45°. The angle θr corresponds to the inclination angle.

<2. Operation>

Figure 4:
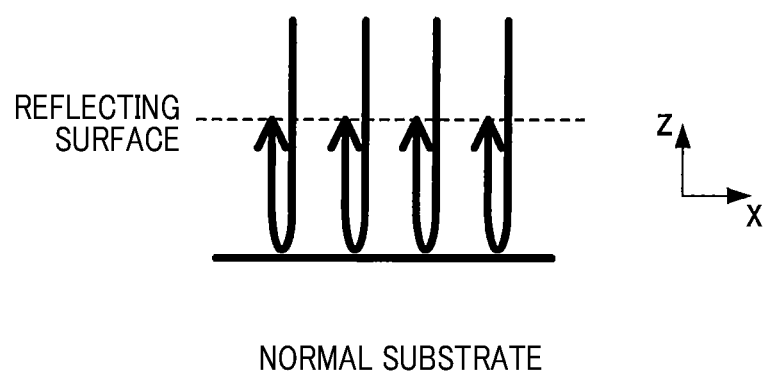
FIG. 4 is a diagram schematically illustrating a reflecting direction from a radiating surface of a normal substrate.
Figure 5:
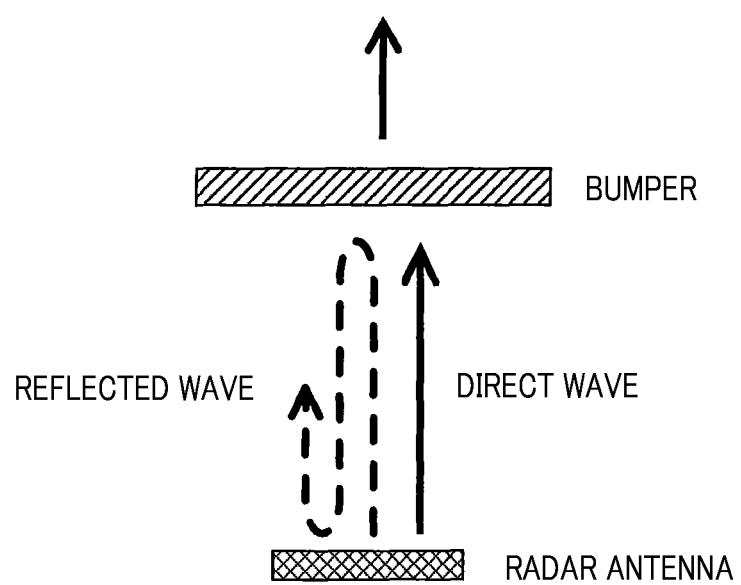
FIG. 5 is a diagram schematically illustrating a reflected wave reflected at a bumper.

In the present embodiment, in the reflecting unit 5, the inductance components of the conductor patches P are all equal, and the capacitance components of the gaps are all equal, leading to a phase difference of 0 deg between the conductor patches P. Therefore, as is the case with a normal substrate, an incident wave having entered the reflecting unit 5 from the z-axis direction has the same phase regardless of whichever portion of the reflecting surface 2a the incident wave bounces off, as illustrated in FIG. 4. As a result, the reflected wave travels toward a direction of arrival of the incident wave. Therefore, if a radiated wave radiated from the radiating surface 2a is reflected by the bumper and arrives at and is re-reflected by the reflecting surface 2a as illustrated in FIG. 5, the re-reflected wave travels in the same direction as that of the radiated wave radiated from the radiating surface 2a.

Here, a polarization direction Dp of the reflected wave reflected by the reflecting unit 5 corresponds to the resonating direction of the reflecting unit 5. The angle θr between the resonating direction of the reflecting unit 5 and the polarization direction Dan is 45°. In other words, the incident wave having entered the reflecting unit 5 is radiated with the polarization direction thereof rotated through 45°. The polarization direction Dp of the reflected wave forms an angle of 45° to the polarization direction Dan. This suppresses possible interference of the reflected wave from the reflecting unit 5 with the radiated wave from the radiating surface 2a.

<3. Effects>

The above-described first embodiment produces the following effects.

(1) The polarization direction Dp of the reflected wave reflected by the reflecting unit 5 is different from the polarization direction Dan of radio waves transmitted and received by the antenna unit 4. As a result, even if the antenna apparatus 1 is installed in the bumper of the vehicle, the re-reflected wave based on the reflected wave from the bumper can be restrained from interfering with the radiated wave from the radiating surface 2a.

<4. Experiments>

Figure 6:
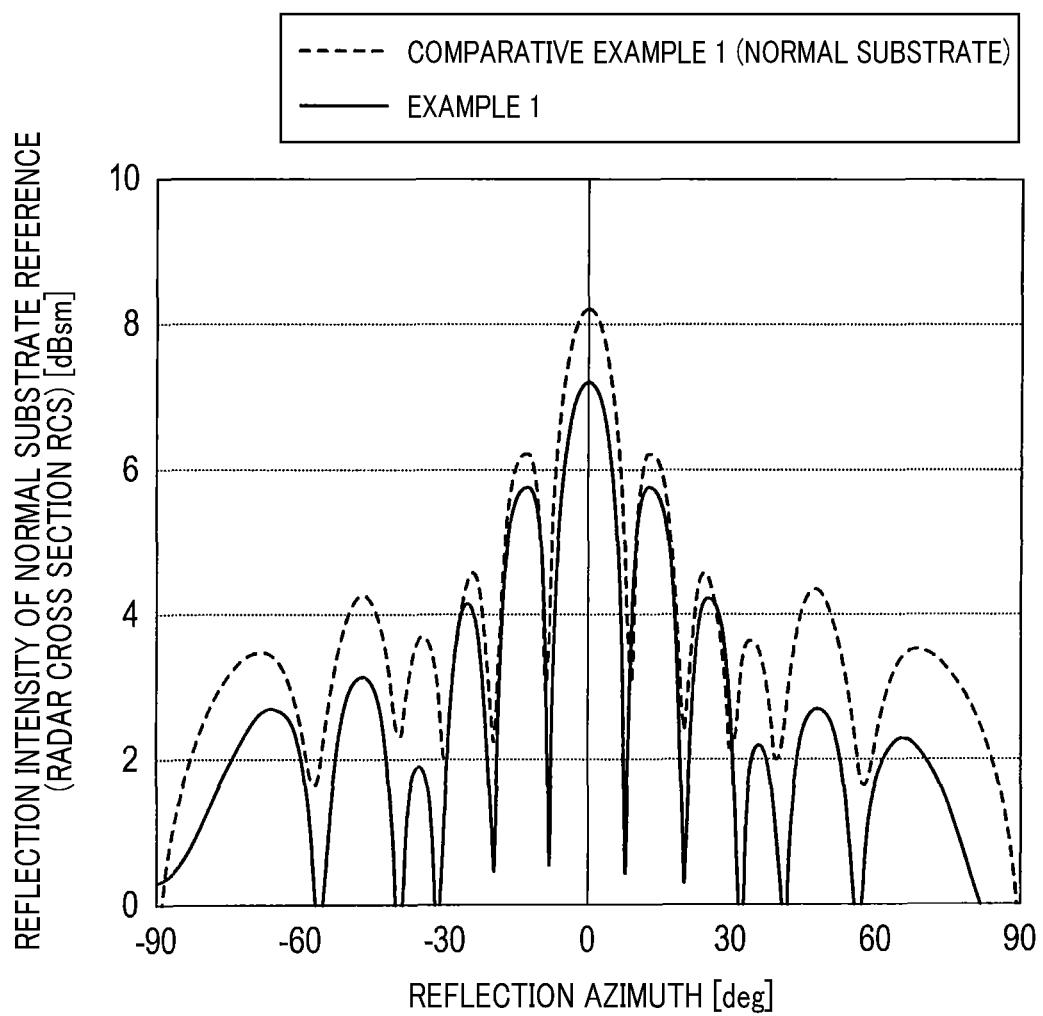
FIG. 6 is a graph illustrating results of simulation in which a reflection intensity on a normal substrate is used as a reference to determine an x component of a reflection intensity resulting from incidence of light from a direction corresponding to a reflection azimuth 0 deg.

The following description given with reference to FIG. 6 relates to results of simulation for Comparative Example 1 using the normal substrate including only the antenna unit 4 and no conductor patches P and Example 1 using the dielectric substrate 2 according to the present embodiment. FIG. 6 illustrates the x component of the reflection intensity with respect to a reflection azimuth, in reference to the normal substrate. FIG. 6 indicates that, for the entire reflection azimuth, the x component of the reflection intensity, that is, the component in the same direction as the polarization direction Dan is less than that in Comparative Example 1.

Second Embodiment

<1. Differences from the First Embodiment>

A second embodiment is similar to the first embodiment in the basic configuration. Thus, description of common components is omitted with differences from the first embodiment focused on. The same reference numerals as those in the first embodiment denote the same components described above in the first embodiment.

An antenna apparatus 1A according to the second embodiment includes a reflecting unit 5a different in configuration from the reflecting unit 5 according to the first embodiment. In the above-described first embodiment, the conductor patches P included in the reflecting unit 5 are all the same in size, and the gaps between the conductor patches P are all the same in size. Thus, the reflected wave has an equal phase regardless of wherever on the radiating surface 2a the reflection occurs. In contrast, the second embodiment is different from the first embodiment in that the phase of the reflected wave is changed according to a reflection point on the radiating surface 2a by changing the size of each of the conductor patches Pa included in the reflecting unit 5.

<2. Configuration>

Figure 7:
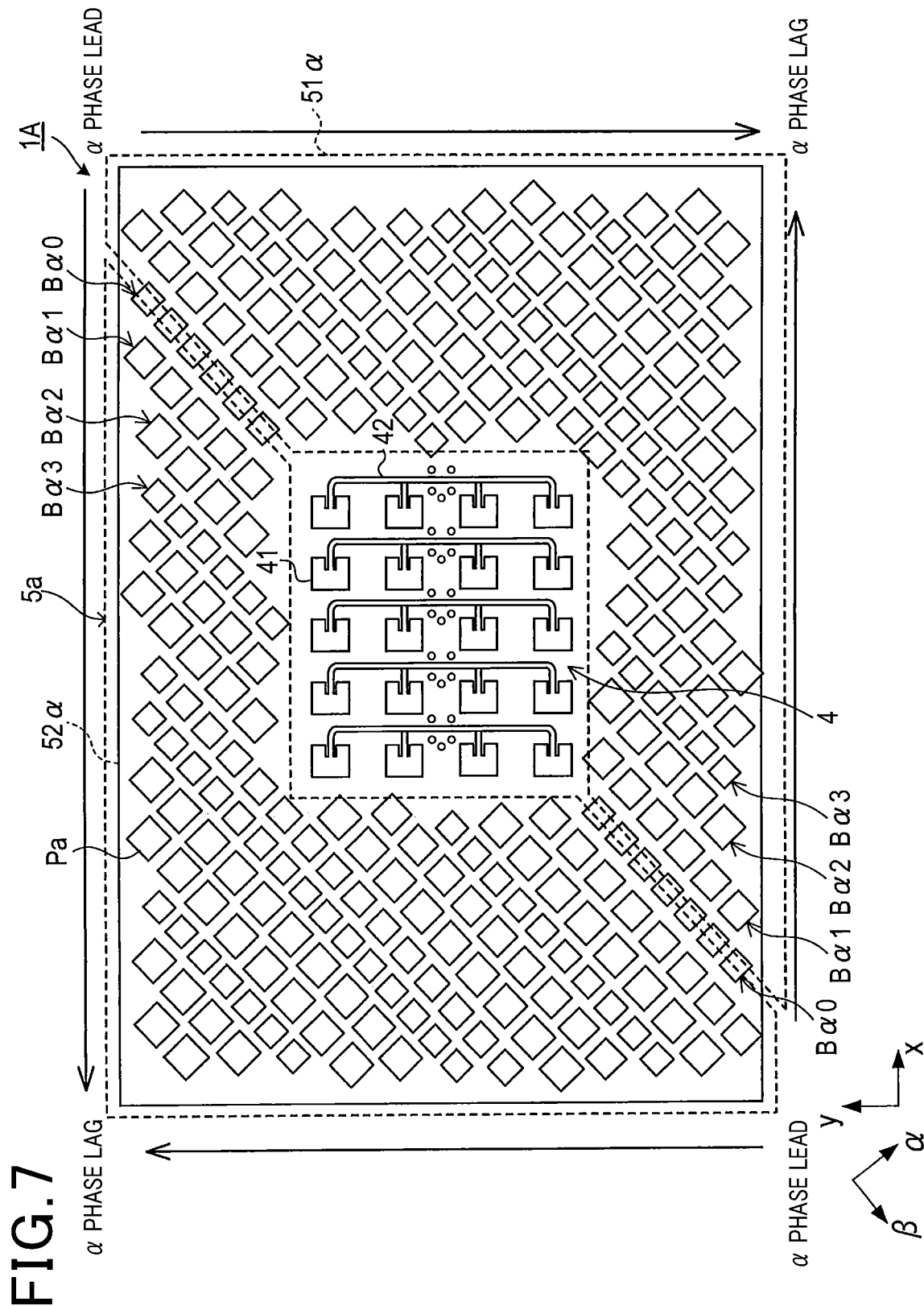
FIG. 7 is a plan view of an x-y plane corresponding to a front surface of an antenna apparatus according to a first example of a second embodiment.
Figure 8:
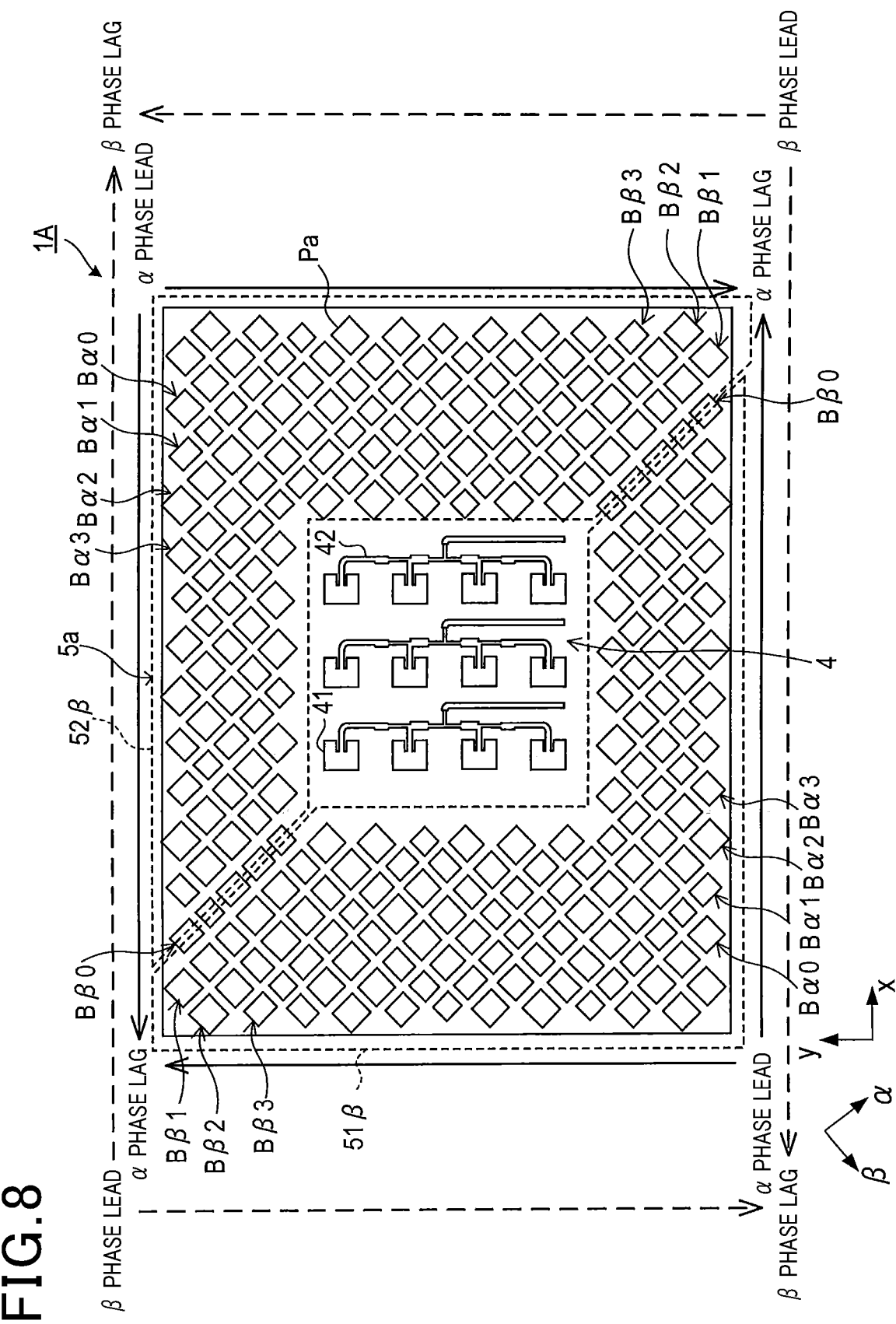
FIG. 8 is a plan view of an x-y plane corresponding to the front surface of the antenna apparatus according to a second example of the second embodiment.

FIG. 7 and FIG. 8 illustrate plan views of x-y planes in a first example and a second example of the reflecting unit 5a according to the second embodiment. In the first example and the second example, the reflecting unit 5a is configured by arranging all rectangular conductor patches Pa such that two adjacent sides of each of the conductor patches Pa are inclined at an angle of 45° to the polarization direction Dan.

[2-1. First Example]

Each of the conductor patches Pa is square or rectangular. As illustrated in FIG. 7, the conductor patches Pa with the same size are arranged in line along a β-axis direction to form blocks Bα. Furthermore, the blocks Bα are arrayed along an α-axis direction, and the size of the conductor patches Pa included in each block Bα varies among the blocks Bα. In other words, a block array direction coincides with the α-axis direction. However, the gaps between the adjacent conductor patches Pa in each block Bα and the intervals between the adjacent conductor patches Pa included in the different adjacent blocks Bα are set to have respective constant sizes.

The reflecting unit 5a is centered at a block Bα0 extending along the β-axis direction and through the center of the reflecting unit 5 in the α-axis direction, and is provided with two areas 51α, 52α separated by the central block βα0, serving as a boundary. The blocks Bα included in the two areas 51a, 52a are structured to be line symmetric with respect to the central block Bα0, and thus, the conductor patches Pa are structured to be line symmetric with respect to the central block Bα0 The block closest to the block Bα0, serving as the boundary between the areas 51α and 52α, is denoted as Bα1, and the remaining blocks are sequentially denoted as Bα2, Bα3, . . . in order of increasing distance from the block Bα0.

Utilizing the properties of the inductance component of each conductor patch Pa and of the capacitance component between the conductor patches Pa, each block Bαi included in the reflecting unit 5 is designed to have such a structure as meets conditions (1.1) to (1.4) described below. An integer of 0 or greater is denoted by i. (1.1) The phase characteristics of reflected waves are line symmetric with respect to the block Bα0. (1.2) A phase lag in the α-axis direction increases with the increasing distance from the block Bα0, that is, increased with the distance from the center of the antenna unit 4. (1.3) At the operating frequency $f_O$, resonance occurs in the α-axis direction. (1.4) Among the blocks Bα, a phase difference Δθα between the adjacent blocks Bα is equal or increases with the distance from the center of the antenna unit 4. That is, the reflecting unit 5 involves an equal phase difference or an inclined phase difference.

In this case, the length of one side of each conductor patch Pa included in each block Bαi is changed to adjust the phase of the reflected wave in two directions centered at the center of the antenna unit 4, that is, in ±directions of the α axis.

[2-2. Second Example]

Each of the conductor patches Pa is square or rectangular. As illustrated in FIG. 8, the conductor patches Pa are arranged in line along the β-axis direction and also arranged in line along the α-axis direction. The conductor patches Pa arranged in line in the β-axis direction form blocks Bα, and the conductor patches Pa arranged in line in the a-axis direction form blocks Bβ. That is, one conductor patch Pa belongs to both the block Bα and the block Bβ. The blocks Bα are arrayed along the α-axis direction, and the blocks Bβ are arrayed along the β-axis direction.

Each of some of the blocks Bα and Bβ includes the conductor patches Pa with the same size, whereas each of the others includes the conductor patches Pa with different sizes. Furthermore, the sizes of the conductor patches Pa included in each block Bα vary among the blocks Bα, and sizes of the conductor patches Pa included in each block Bβ vary among the blocks Bβ. However, a constant size is set for the intervals between the conductor patches Pa in each of the blocks Bα and Bβ, for the intervals between the adjacent conductor patches Pa included in the different adjacent blocks Bα, and for the intervals between the adjacent conductor patches Pa included in the different adjacent blocks Bβ.

The reflecting unit 5a is provided with the two areas 51α, 52α separated by the block Bα0, serving as a boundary. Moreover, the reflecting unit 5a is centered at a block Bβ0 extending along the α-axis direction and through the center of the reflecting unit 5a in the β-axis direction and is provided with two areas 51β, 52β separated by the central block Bβ0, serving as a boundary. The blocks Bβ included in the two areas 51β, 52β are structured to be line symmetric with respect to the central block Bβ0, and thus, the conductor patches Pa are structured to be line symmetric with respect to the central block Bβ0. That is, the reflecting unit 5a is structured to be line symmetric not only with respect to the block Bα0 but also with respect to the block Bβ0. The block closest to the block Bβ0, serving as the boundary between the areas 51β and 52β, is denoted as Bβ1, and the remaining blocks are sequentially denoted as Bβ2, Bβ3, . . . in order of increasing distance from the block Bβ0.

As described in the first example, the blocks Bαi, Bβi are designed to have such a structure as satisfy conditions (2.1) to (2.4) described below. (2.1) The phase characteristics of the reflected wave are line symmetric with respect to the block Bα0 and with respect to the Bβ0. (2.2) Phase lags in the α-axis direction and the β-axis direction increases with increasing distance from the center of the antenna unit 4. (2.3) At the operating frequency $f_O$, resonance occurs in the α-axis direction and the β-axis direction. (2.4) Among the blocks Bα, the phase difference Δθα between the adjacent blocks Ba is equal or increases with the increasing distance from the center of the antenna unit 4, and among the blocks Bβ, a phase difference Δθβ between the adjacent blocks Bβ is equal or increases with the increasing distance from the center of the antenna unit 4.

In this case, the lengths of two sides of each conductor patch Pa in the a direction and the β direction, respectively, are changed to adjust the phase of the reflected wave in four directions centered at the center of the antenna unit 4, that is, in ±directions of the a axis and ±directions of the β axis.

[2-3. Third Example]

A third example corresponds to the first example in which the a axis and the β axis are interchanged with each other. That is, in the third example, the conductor patches Pa with the same size are arranged in line along the α-axis direction, and the conductor patches Pa arranged in line form the blocks Bβ. The reflecting unit 5a is provided with the two areas 51β, 52β separated by the block Bβ0, and has a structure line symmetric with respect to the block Bβ0. The blocks Bβi included in the reflecting unit 5a are designed to have such a structure as meets the conditions (1.1) to (1.4) in the above-described first example in which a is interchanged with β.

<3. Design>

Figure 9:
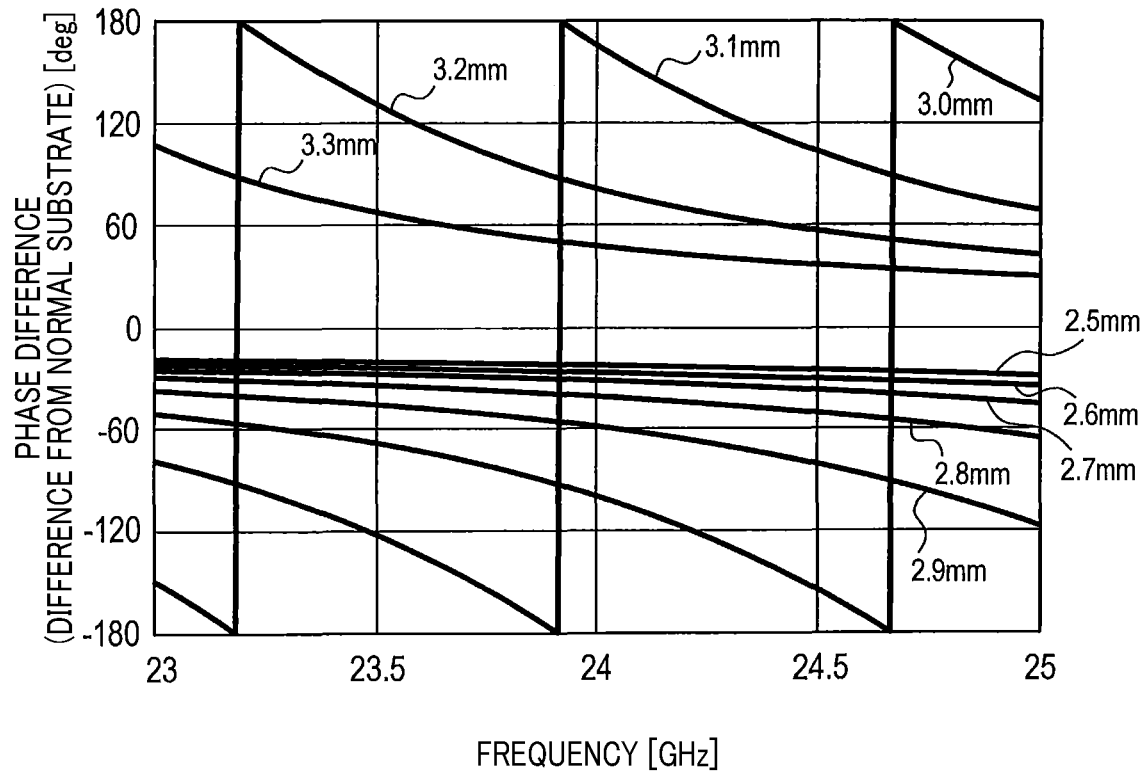
FIG. 9 is a graph illustrating frequency characteristics exhibiting a phase of a reflected wave from each conductive patch determined using, as a reference, a phase of a reflected wave from a normal substrate, by variously changing he size of the conductive patch.

A design which realizes the phase characteristics in the first to third examples will be described below. Specifically, with reference to the phases of reflected waves from the normal substrate, which is a substrate with only the antenna unit 4 installed thereon, the phase characteristics of reflected waves from the conductor patches Pa (hereinafter referred to as reflection characteristics) are as illustrated in FIG. 9. In this case, the intervals between the conductor patches Pa are fixed to 1 mm, and the size of each side of each of the conductor patches Pa in a direction involving a phase difference is changed between 2.5 mm and 3.3 mm.

As illustrated in FIG. 9, with the conductor patches Pa having a constant size, the phase lag increases with increasing operating frequency $f_O$. Furthermore, with a constant operating frequency $f_O$, the phase lag increases with increasing size of each conductor patch Pa. However, the phase difference ranges from −180 deg to 180 deg, and a phase difference of −180 deg and a phase difference of 180 deg are equated with each other. In other words, the magnitude of the difference in phase between the normal substrate and the dielectric substrate ranges from 0 deg to 180 deg. Once the phase difference reaches 180 deg, the phase difference starts to decrease from 180 deg. Therefore, when each conductor patch Pa has an excessively large size, the difference in phase from the normal substrate is excessively small, reducing a suppression effect on the intensity of the reflected wave traveling in the same direction as that of the radiated wave. Specifically, when the size of the conductor patches Pa is greater than three-quarters of the effective wavelength, the difference in phase from the normal substrate is excessively small. Thus, the size of each side of each conductor patch Pa is desirably smaller than or equal to three-fourths of the effective wavelength.

In the first example and the third example, the size of the conductor patches Pa in the block Bα, Bβ serving as a reference is optionally set. Then, the size of the block Bα, Bβ adjacent to the block Bα, Bβ with the size thereof determined is set so as to obtain the phase difference Δθα, Δθβ preset for the operating frequency $f_O$, utilizing the relations illustrated in FIG. 9. This process is sequentially repeated to design the size of each of the conductor patches Pa in all the blocks Bα, Bβ.

In the second example, the sizes, in the a direction and the β direction, of the conductor patch Pa serving as a reference are optionally set. Then, the size, in the α direction, of the conductor patch Pa adjacent, in the α direction, to the conductor patch Pa with the size thereof determined is set so as to obtain the set phase difference Δθα, utilizing the relations illustrated in FIG. 9, and the size, in the β direction, of the conductor patch Pa adjacent, in the β direction, to the conductor patch Pa with the size thereof determined is set so as to obtain the set phase difference Δθβ, utilizing the relations illustrated in FIG. 9. This process is sequentially repeated to design the sizes of all the conductor patches Pa.

FIG. 10 illustrates example settings of the phases of reflected waves from the blocks Bα0, Bβ0 to Bα6, Bβ6 in the first example and the third example. FIG. 10 is a list indicating the phases in the blocks Bα, Bβ for Comparative Example 1 using the normal substrate, Example 2 with the phase difference Δθα set to a constant value of 100 deg, and Example 3 with the phase difference Δθβ set to a constant value of 100 deg.

FIG. 11 illustrates an example design of the conductor patches Pa for the third example. FIG. 11 is a list of the phases of reflected waves in the blocks Bβ0 to Bβ5 and the sizes of the conductor patches Pa resulting in the corresponding phase differences Δθβ for Comparative Example 1 and Examples 4 to 7. Examples 4 to 6 are examples with equal phase differences Δθβ of 30 deg, 60 deg, and 90 deg, respectively. Example 7 is an example with an inclined phase difference Δθβ increasing in increments of 30 deg.

<4. Operation>
[4-1. Equal Phase Difference]

Figure 12:
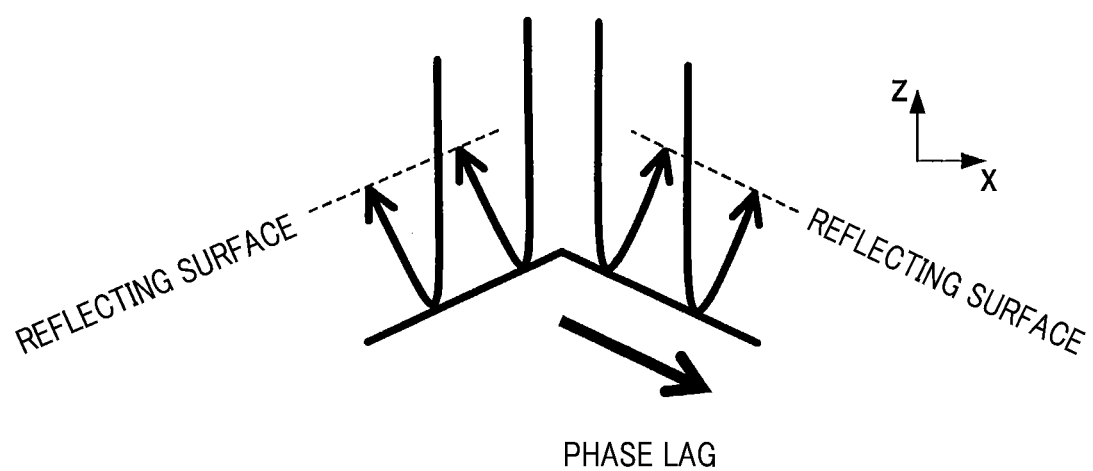
FIG. 12 is a diagram schematically illustrating a reflecting direction from a radiating surface of a substrate subjected to a constant phase difference of the reflected wave between adjacent conductive patches included in different adjacent blocks.

With the equal phase difference Δθα, Δθβ, an incident wave from the z-axis direction is reflected by the radiating surface 2a, and the reflected wave involves a phase lag increasing consistently with the distance from the block Bα0, Bβ0, as illustrated in FIG. 12. However, the phase lag is proportional to the distance from the block Bα0, Bβ0. As a result, the reflected wave is reflected in a constant direction at a certain angle to the direction of arrival of the incident wave. In other words, the resultant reflection characteristics correspond to reflection from a planar refracting substrate which is bent like a chevron.

[4-2. Inclined Phase Difference]

Figure 13:
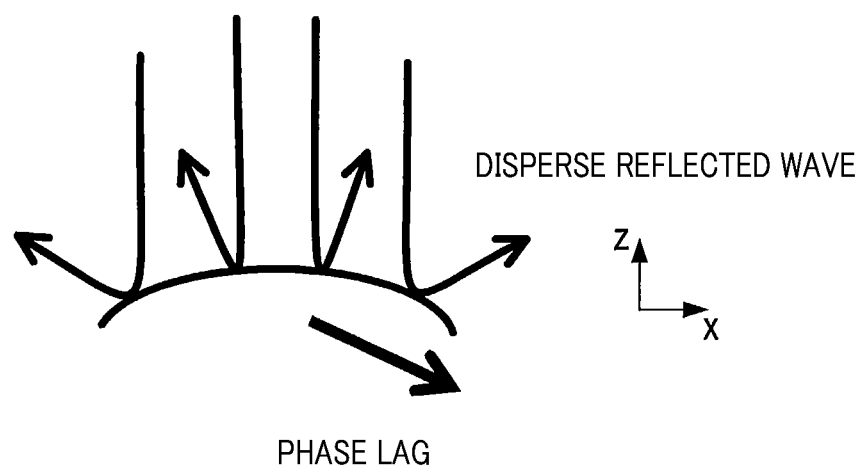
FIG. 13 is a diagram schematically illustrating the reflecting direction from the radiating surface of the substrate having a gradually increased reflected wave phase difference between adjacent conductor patches included in different adjacent blocks.

On the other hand, with the inclined phase differences Δθα, Δθβ, an incident wave from the z-axis direction is reflected by the reflecting surface 2a, and the reflected wave involves a phase lag increasing consistently with the distance from the blocks Bα0, Bβ0, as illustrated in FIG. 13. However, the phase lag increases in an accelerating manner with the increasing distance from the block Bα0, Bβ0. As a result, the reflected wave is reflected in a direction at a certain angle to the direction of arrival of the incident wave, with the angle of the reflection increasing consistently with the distance from the block Bα0, Bβ0. In other words, the resultant reflection characteristics correspond to reflection from a curved substrate, with the reflected wave scattered and traveling in various directions rather than in a constant direction.

<5. Effects>

The second embodiment described above in detail produces the following effects in addition to the effect (1) of the first embodiment.

(2) Resonance can be caused in two directions different from the polarization direction Dan by shaping each conductor patch Pa like a rectangle and adjusting the lengths of the two adjacent sides of the rectangle.

(3) When the phase difference Δθα, Δθβ, of the reflected wave between the adjacent blocks Bα, Bβ is constant, a wave front of a wave re-reflected from the reflecting unit 5 after entering the reflecting unit 5 is inclined from the center of the dielectric substrate 2, toward the outer side of the dielectric substrate 2. This allows suppression of the reflection intensity of the reflected wave traveling in the same direction as that of the radiated wave radiated from the antenna unit 4.

(4) When the difference in the phase of the reflected wave between the adjacent blocks Bα, Bβ is increased with the increasing distance from the center of the antenna unit 4, the incident wave having entered the reflecting unit 5a can be reflected in various directions rather than in a constant direction. That is, the reflected wave having entered the reflecting unit 5a can be scattered. This allows suppression of the reflection intensity of the reflected wave traveling in the same direction as that of the radiated wave radiated from the antenna unit 4. Moreover, the reflection can be restrained from forming a strong beam different from the main beam in a particular direction.

<6. Experiments>

Figure 14:
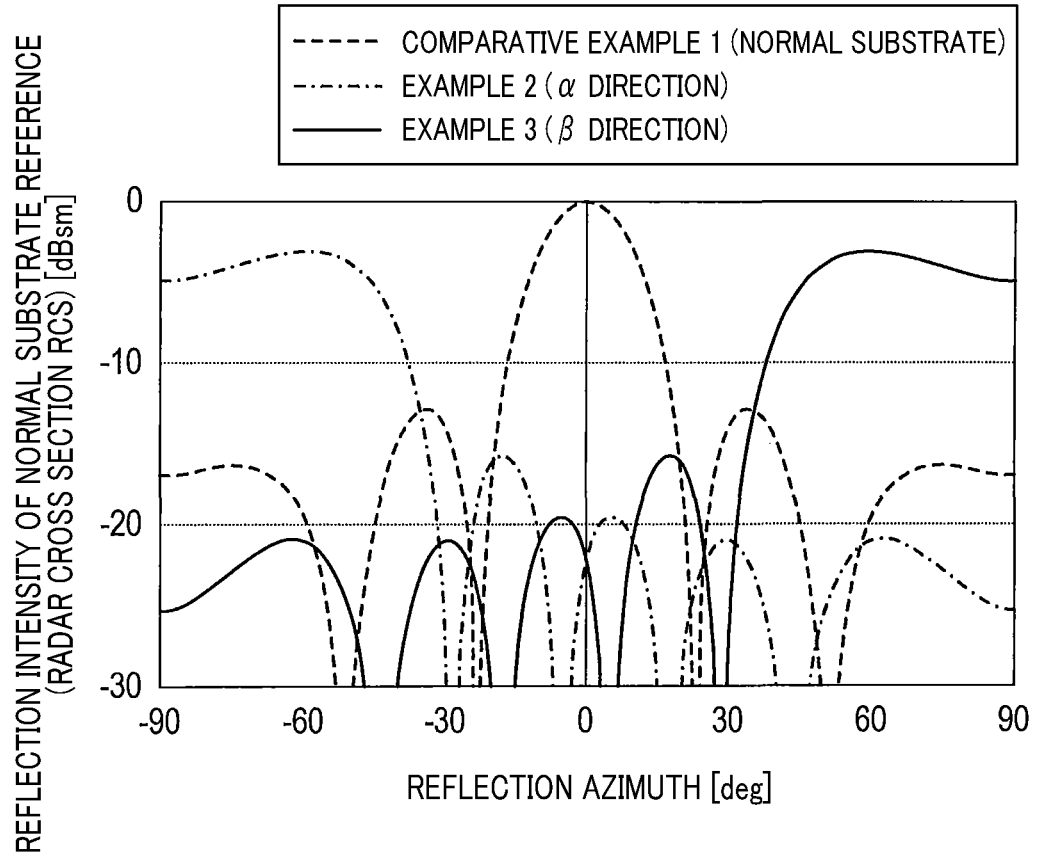
FIG. 14 is a graph illustrating results of simulation in which a reflection intensity resulting from incidence of light from the direction corresponding to the reflection azimuth 0 deg is determined using, as a reference, the reflection intensity on the normal substrate, in the first and third examples of the second embodiment.

The results of simulation for Comparative Example 1 and Examples 2, 3 described above will be described with reference to FIG. 14. In FIG. 14, the x-axis direction is defined as a reflection azimuth 0 deg, the α-axis direction is defined as a reflection azimuth −45 deg, and the β-axis direction is defined as a reflection azimuth 45 deg. FIG. 14 indicates that, when the reflection azimuth ranges from −30 deg to 30 deg, both Example 2 and Example 3, compared to Comparative Example 1, result in significant suppression of the reflection intensity. However, Example 2 and Example 3 result in formation of large side lobes at a reflection azimuth of approximately −50 deg and a reflection azimuth of approximately 50 deg.

Figure 15:
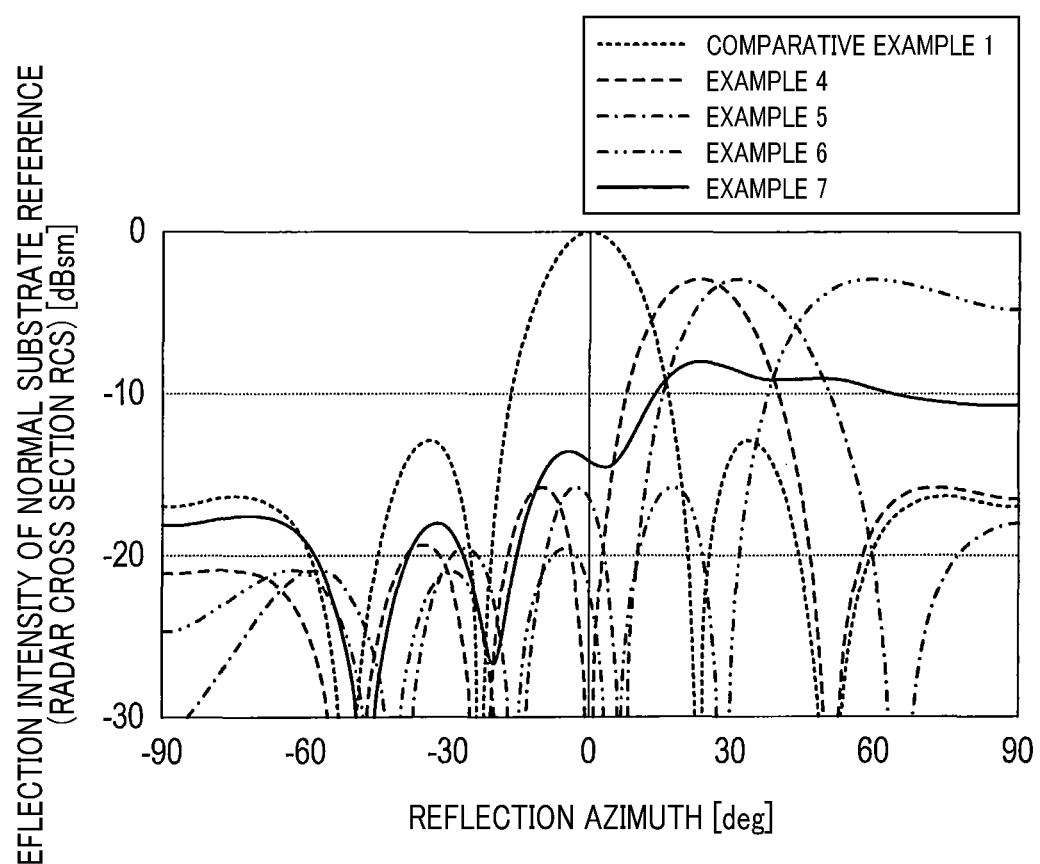
FIG. 15 is a graph illustrating results of simulation in which the reflection intensity resulting from the incidence of light from the direction corresponding to the reflection azimuth 0 deg is determined using, as a reference, the reflection intensity on the normal substrate, in each example illustrated in FIG. 11.

The results of simulation for Comparative Example 1 and Examples 4 to 7 described above will be described with reference to FIG. 15. FIG. 15 indicates that, compared to Comparative Example 1, all of Examples 4 to 7 result in significant suppression of the reflection intensity near the reflection azimuth 0 deg. However, Examples 4 to 6 with the equal phase difference result in formation of respective large side lobes within the range from a reflection azimuth 20 deg to a reflection azimuth 60 deg. On the other hand, Example 7 with the inclined phase difference does not result in formation of any side lobe.

Figure 16:
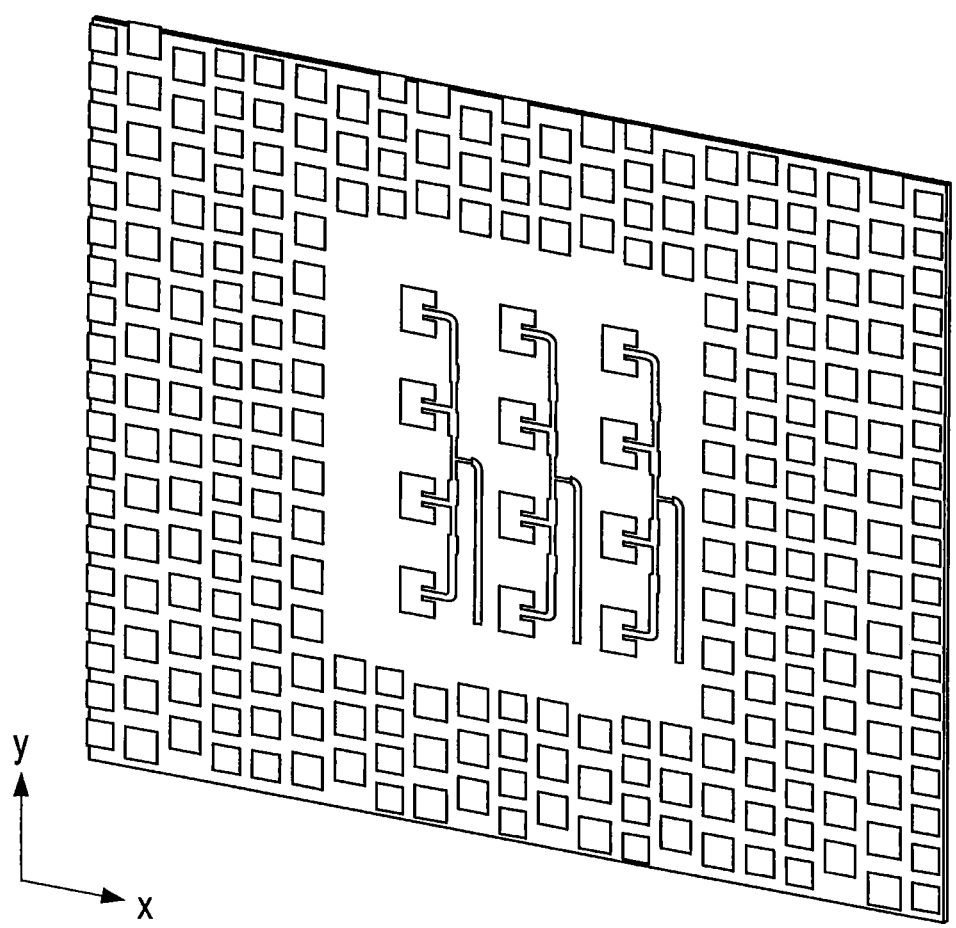
FIG. 16 is a plan view of an x-y plane corresponding to a front view of the antenna apparatus configured such that a reflected wave reflected by a reflecting unit corresponds to the same polarized wave to which a reflected wave from an antenna unit corresponds.

Moreover, the results of simulation for Comparative Example 1, Comparative Example 2, and Example 8 will be described with reference to FIGS. 16 to 21. Comparative Example 2 is an example in which the conductor patches with the same size are arranged in line along the y-axis direction and the blocks are arrayed along the x-axis direction such that the resonating direction of the conductor patches is the same as the polarization direction Dan, as illustrated in FIG. 16. In Comparative Example 2, in the polarization direction Dan, the phase lag of the reflected wave increases with the increasing distance from the antenna unit, and the phase differences between the blocks are equal. Example 8 corresponds to the second example involving the equal phase difference.

Figure 17:
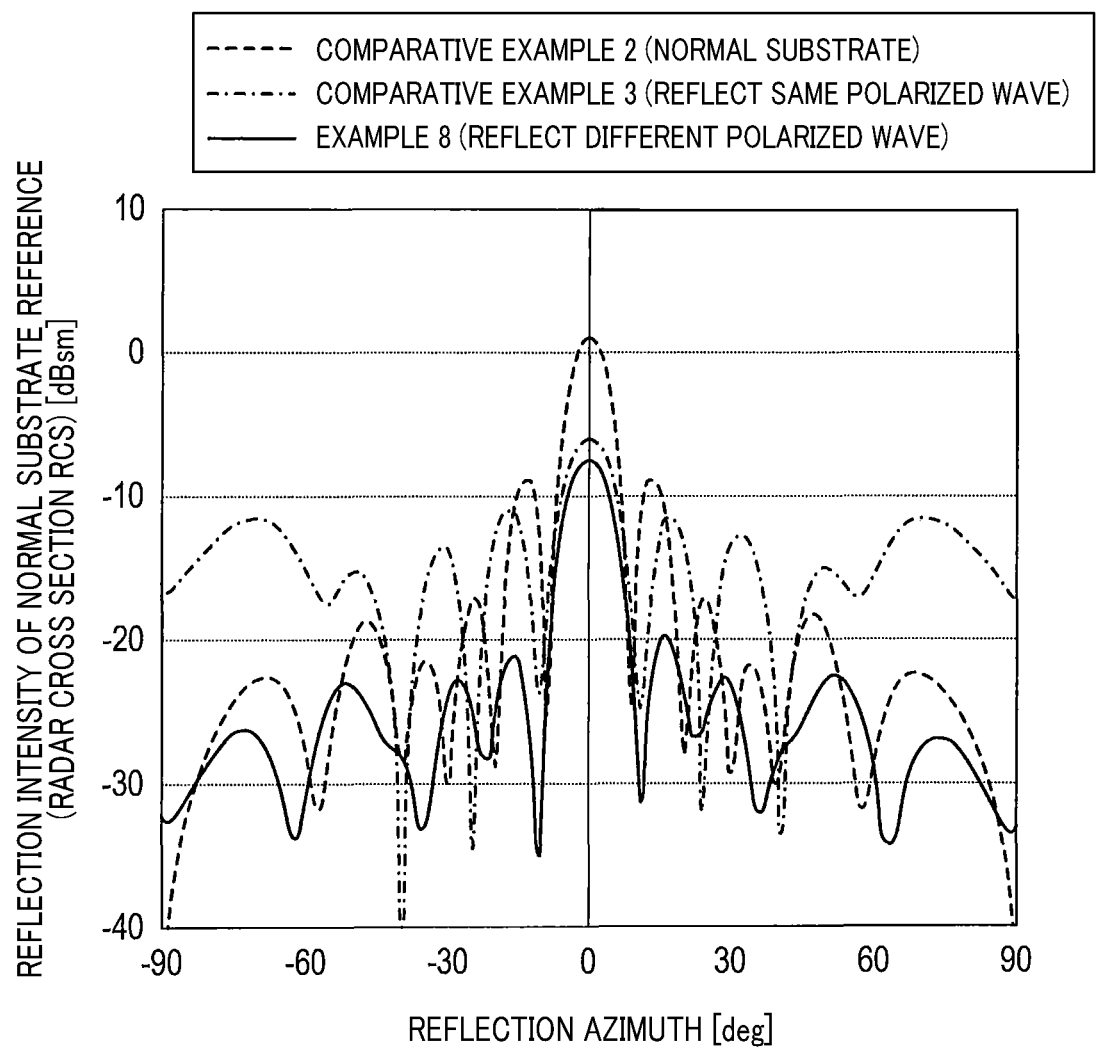
FIG. 17 is a graph illustrating results of simulation in which the reflection intensity of reflection from the normal substrate is used as a reference to determine the x component of the reflection intensity resulting from the incidence of light, from the direction corresponding to the reflection azimuth 0 deg, for the normal substrate, the substrate with the same polarized wave illustrated in FIG. 16, and the substrate according to the second example of the second embodiment.

FIG. 17 indicates that, compared to Comparative Example 1, both Comparative Example 2 and Example 8 result in significant suppression of the reflection intensity near the reflection azimuth 0 deg. However, in Comparative Example 2, due to the suppression of the reflection intensity near the reflection azimuth 0 deg, the reflection intensity within the range from the reflection azimuth 30 deg to the reflection azimuth 90 deg is higher than in Comparative Example 1. In contrast, in Example 8, the reflection intensity is more significantly suppressed across the entire reflection azimuth than in Comparative Example 1.

Figure 18:
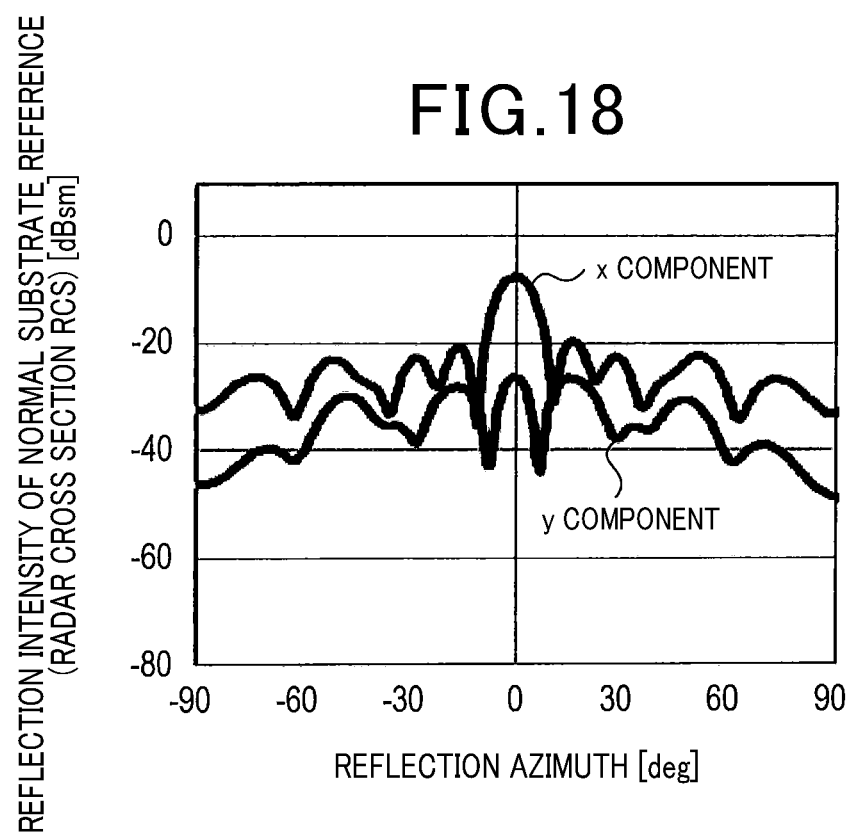
FIG. 18 is a graph illustrating the x component and a corresponding y component in the simulation results according to the second example of the second embodiment illustrated in FIG. 17.
Figure 19:
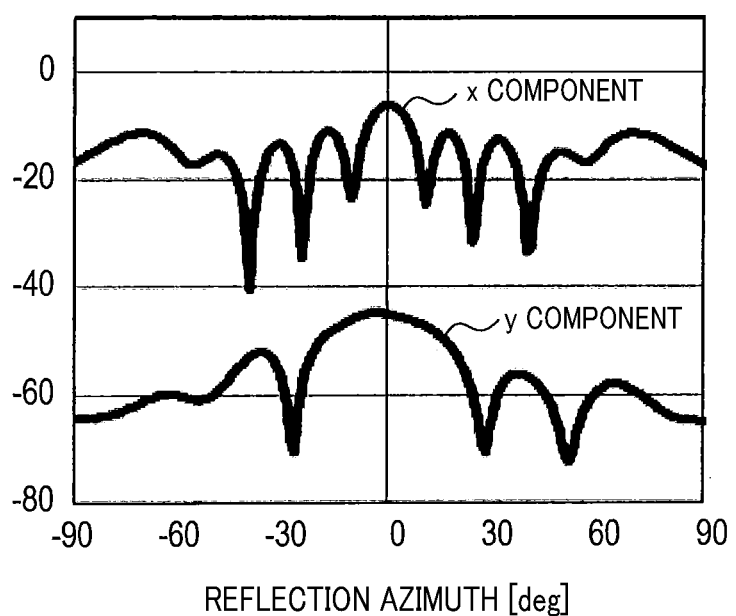
FIG. 19 is a graph illustrating the x component and the corresponding y component in the simulation results according to the substrate with the same polarized wave illustrated in FIG. 17.
Figure 20:
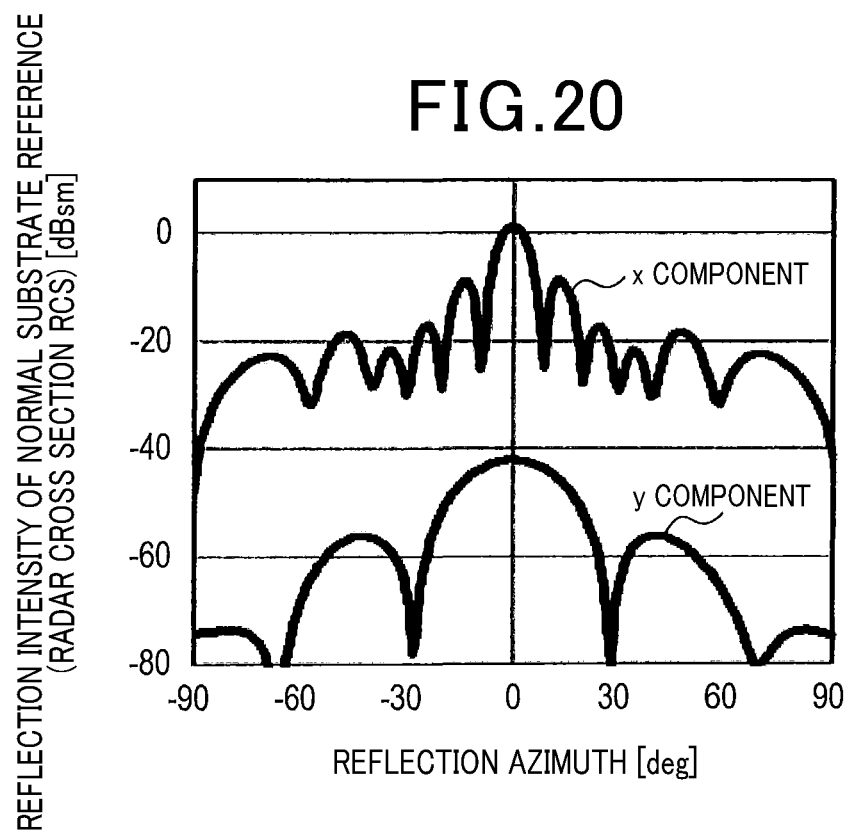
FIG. 20 is a graph illustrating the x component and the corresponding y component in the simulation results according to the normal substrate illustrated in FIG. 17.

A comparison of FIGS. 18 to 20 indicates that, in Comparative Example 1 and Comparative Example 2, a y component which is a component in a direction of 90° to the polarization direction Dan is very small compared to an x component which is a component in the polarization direction Dan. In contrast, compared to Comparative Example 1 and Comparative Example 2, Example 8 results in a very large y component. This indicates that the polarization direction of the incident wave having entered the reflecting unit 5a is rotated through 45° with respect to the polarization direction Dan, causing a portion of the x component of the incident wave to be converted into a y component before the incident wave is reflected.

Figure 21:
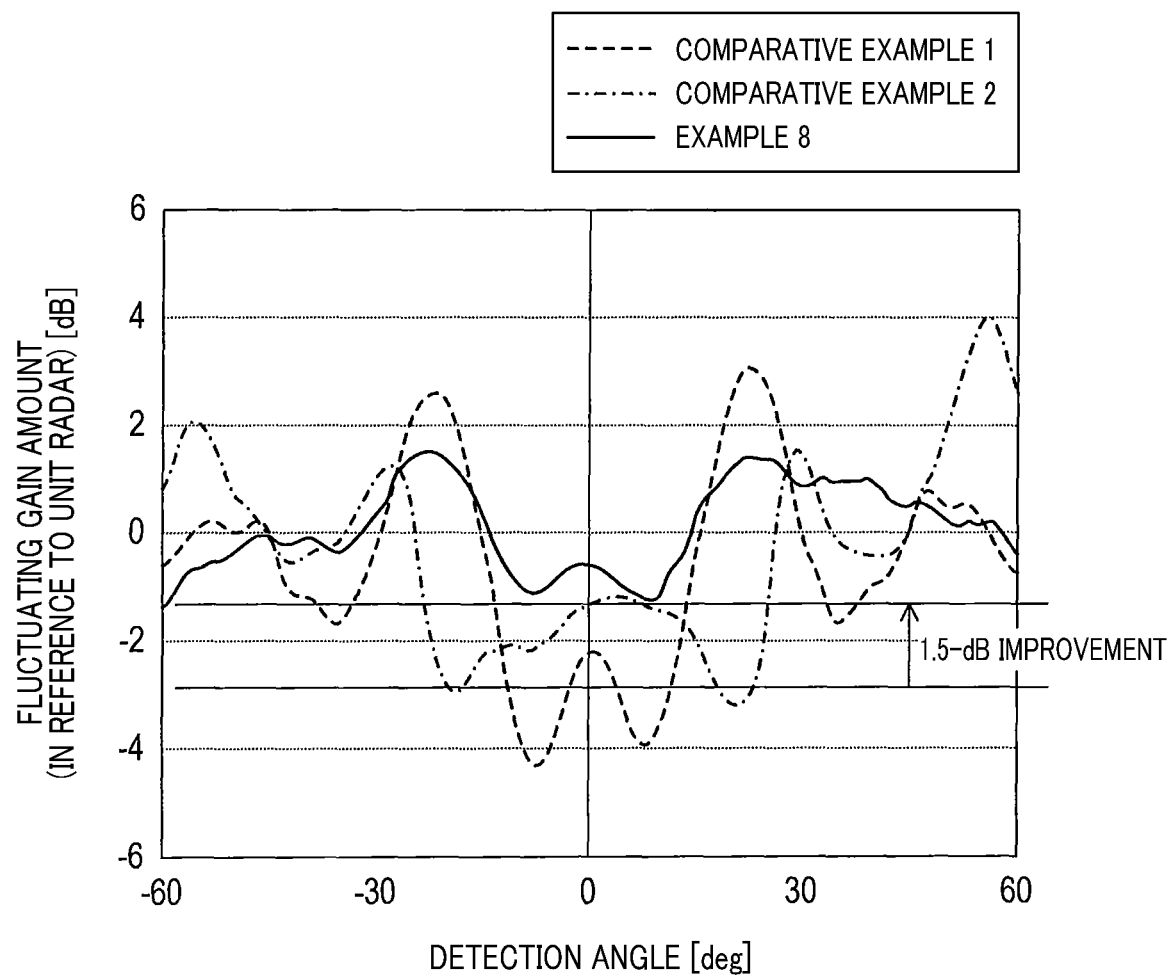
FIG. 21 is a graph illustrating results of simulation in which an antenna gain resulting from the absence of a bumper is used as a reference to determine the amount of a gain fluctuation in the antenna gain resulting from adverse effects of interference based on a reflected wave resulting from the presence of a bumper.

Furthermore, as illustrated in FIG. 21, which compares a case with a bumper with a case with no bumper, a gain fluctuation of up to approximately 4 dB has occurred in Comparative Example 1, whereas the gain fluctuation has been reduced to approximately 3 dB in Comparative Example 2. Moreover, in Example 8, the gain fluctuation has been reduced to approximately 1.5 dB, which corresponds to approximately 1.5-dB improvement of the gain fluctuation compared to the gain fluctuation in Comparative Example 2.

Other Embodiments

The embodiments of the present disclosure have been described. However, the present disclosure is not limited to the above-described embodiments, and many variations may be made to the embodiments.

Figure 22:
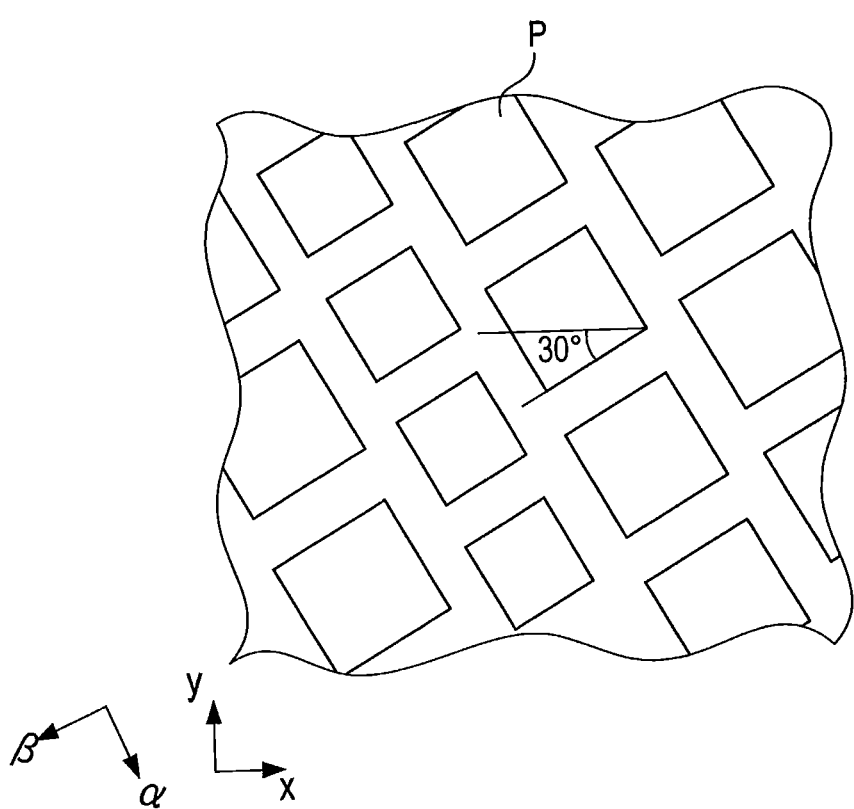
FIG. 22 is a plan view of an x-y plane illustrating a part of the front view of the antenna apparatus corresponding to another embodiment.
Figure 23:
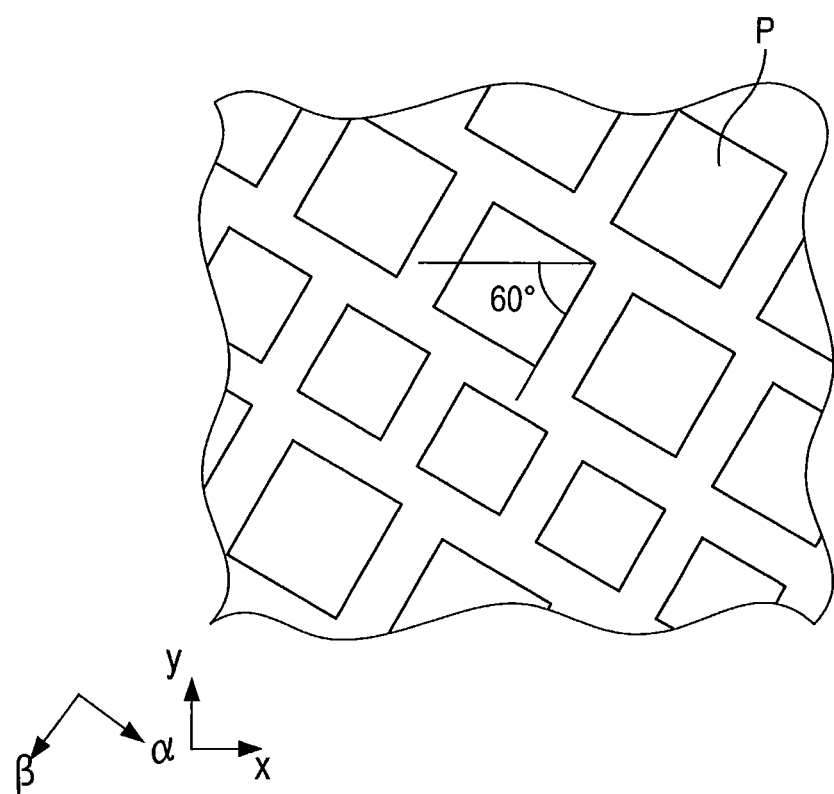
FIG. 23 is a plan view of an x-y plane illustrating a part of the front view of the antenna apparatus corresponding to another embodiment.
Figure 24:
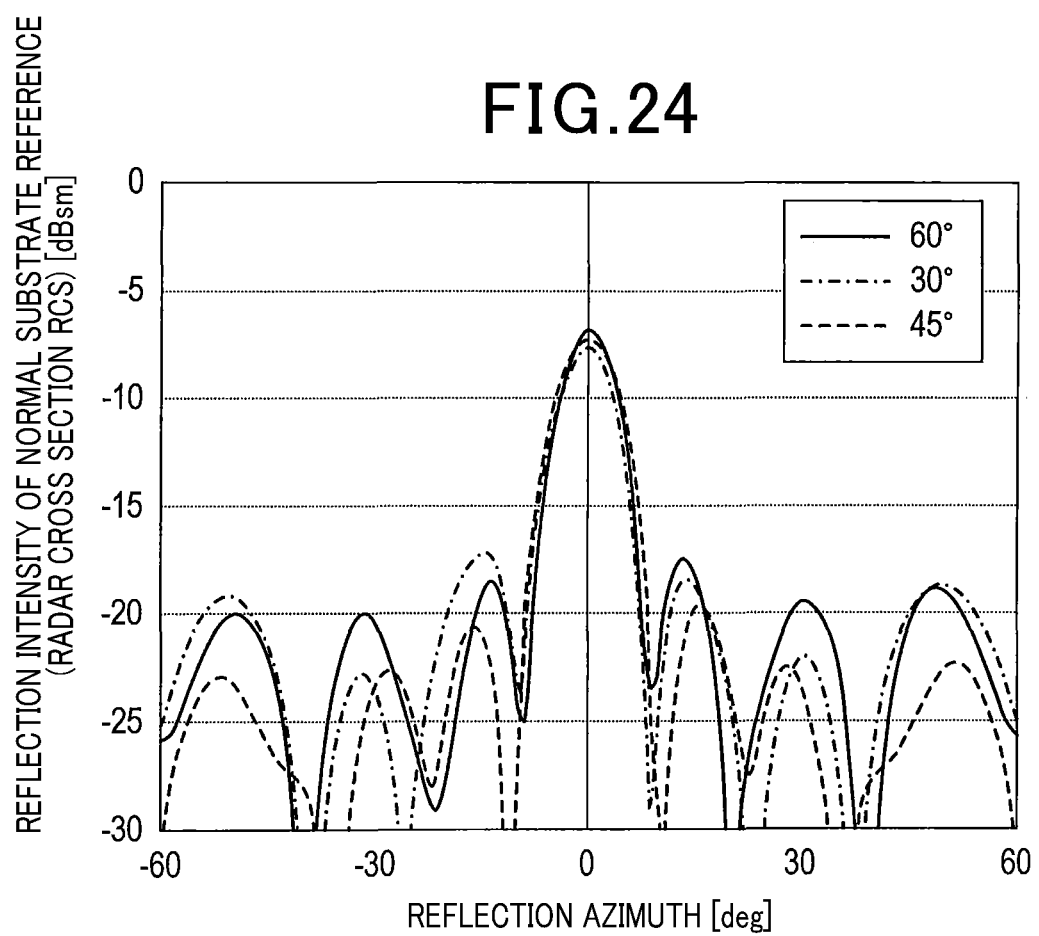
FIG. 24 is a graph illustrating results of simulation in which the reflection intensity of reflection from the normal substrate is used as a reference to determine the reflection intensity resulting from the incidence of light from the direction corresponding to the reflection azimuth 0 deg in a case where an inclination angle at which the conductor patches are arranged is varied.

(a) In the above-described embodiments, the angle θr between the resonating direction of the conductor patches P, Pa and the polarization direction Dan is 45°. However, the present disclosure is not limited to this. For example, the angle θr may be 30° as illustrated in FIG. 22 or 60° as illustrated in FIG. 23. As illustrated in FIG. 24, in a case where the angle θr is 30° or 60°, the reflection intensity is high within the range from a reflection azimuth 10 deg to the reflection azimuth 60 deg, compared to the case where the angle θr is 45°. However, the reflection intensity near the reflection azimuth 0 deg has been reduced to a value close to a value to which the reflection intensity has been reduced in the case where the angle θr is 45°. Therefore, an angle θr of 45° allows the suppression of adverse effects of the reflected wave to be maximized, but the suppression effect on the adverse effects of the reflected wave can also be exerted by setting the angle θr to another value such as 30° or 60°.

Figure 25:
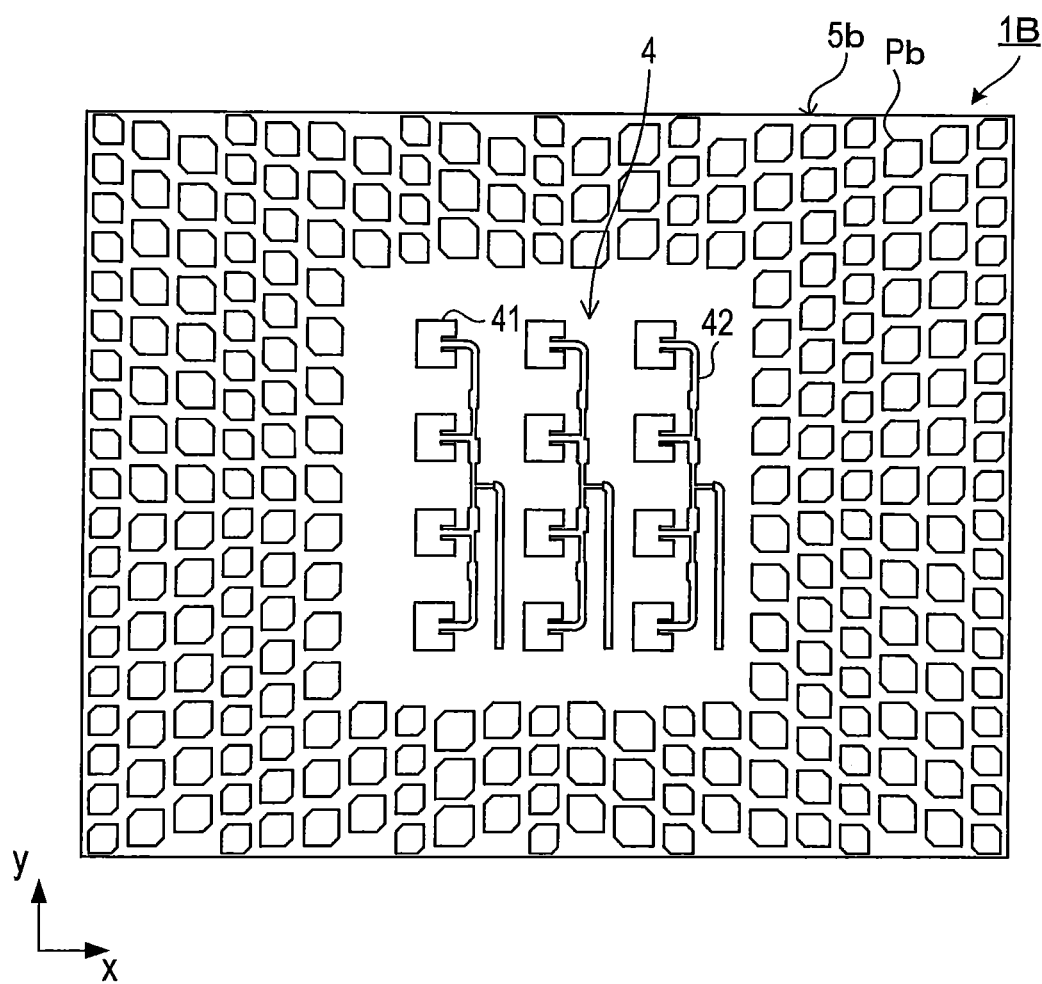
FIG. 25 is a plan view of an x-y plane corresponding to the front surface of the antenna apparatus corresponding to another embodiment.
Figure 26:
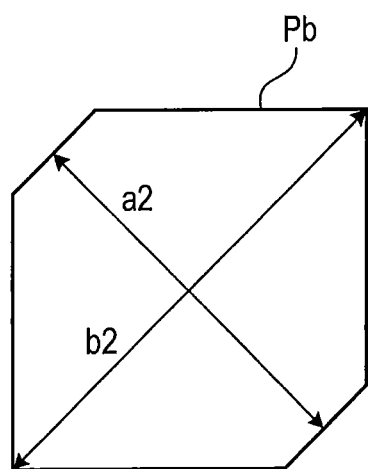
FIG. 26 is a diagram of a conductor patch in the antenna apparatus illustrated in FIG. 25.

(b) As illustrated in FIG. 25 and FIG. 26, instead of the rectangular conductor patches P, Pa, cutout conductor patches Pb may be used each of which is shaped like a rectangle with at least one corner thereof cut out. When a spacing between opposite cutout portions of the conductor patch Pb is denoted as a2 and a spacing between two vertexes adjacent to the cutout portions is denoted as b2, a2≠b2. By having such a cutout shape, the conductor patch Pb exhibits a circular polarization characteristic. Thus, the incident wave having entered the reflecting unit 5 can be reflected with the polarization direction thereof rotated, without the need to incline to the polarization direction Dan, all the sides of each conductor patch Pb other than the cutout portions. Moreover, the phase lag of the reflected wave can be increased with the increasing distance from the antenna unit 4 by changing the size of each cutout conductor patch Pb among the blocks formed along the y-axis direction. Therefore, effects similar to those of the above-described embodiments can be produced. The conductor patch Pb may have any shape with at least one corner thereof cut out.

Moreover, a plurality of areas may be provided in a reflecting unit 5b, and at least either the amount of cutout portion or the positions of the conductor patch Pb where the cutout portion is formed may be changed among the conductor patches Pb. In FIG. 25, the reflecting unit 5b is provided with four areas centered around the antenna unit 4. The conductor patches Pb in an upper right area and a lower left area are each shaped like a rectangle with an upper left corner and a lower right corner thereof cut out. The conductor patches Pb in an upper left area and a lower right area are each shaped like a rectangle with an upper right corner and a lower left corner thereof cut out. Varying, among the areas, the positions where the cutout portion is formed allows the variation, among the areas, of a rotating direction of a circularly polarized wave, that is, whether the polarized wave is rotated clockwise or counterclockwise. Furthermore, varying the amount of cutout among the areas allows the amount of rotation of the polarized wave to be varied among the areas. The number of the areas is not limited to four, and any number of areas may be formed.

(c) In the above-described embodiments, the lagging phase is adjusted by varying the size of the conductor patch P or the conductor patch Pa with the constant gap formed between the conductor patches P or with the constant gap formed between the adjacent conductor patches Pa included in the different adjacent blocks Bα, Bβ. However, the present disclosure is not limited to this. The lagging phase may be adjusted by varying the gap between the conductor patches P or the gap between the adjacent conductor patches Pa included in the different adjacent blocks Bα, Bβ. With a constant operating frequency $f_O$, the phase lag increases with decreasing gap.

(d) The conductor patches P, Pa may not be rectangular. The conductor patches P, Pa may be shaped like, for example, rods. If the conductor patches P, Pa are shaped like rods, the conductor patches P, Pa may be arranged such that a longitudinal direction of each rod-shaped conductor patch is inclined to the polarization direction Dan.

(e) A plurality of functions provided in one component of each of the above-described embodiments may be fulfilled by a plurality of components, or one function provided in one component may be achieved by a plurality of components. Furthermore, a plurality of functions provided in a plurality of components may be fulfilled by one component, or one function implemented by a plurality of components may be achieved by one component. Alternatively, the configuration of each of the above-described embodiments may be partly omitted. Alternatively, at least a part of the configuration of each of the above-described embodiments may be added to the configuration of another of the above-described embodiments or may replace a corresponding part thereof. The embodiments of the present disclosure correspond to all aspects included in technical concepts specified only by the language in the claims.

(f) The present disclosure can be implemented in various forms such as, besides the above-described antenna apparatus, a system including the above-described antenna apparatus as a component and a method for suppressing possible interference caused by an unwanted reflected wave.

The invention claimed is:

1. An antenna apparatus mounted in a bumper of a vehicle, the antenna apparatus comprising:
a dielectric substrate;
a base plate provided on the dielectric substrate and configured to serve as an antenna ground surface;
an antenna unit provided on a surface of the dielectric substrate, and having an antenna pattern configured to serve as an antenna array; and
a reflecting unit arranged to surround the antenna unit, including a plurality of conductor patterns serving as a reflector,
wherein each of the plurality of conductor patterns has a size smaller than an effective wavelength, at a preset operating frequency of the antenna unit, and is structured to resonate in a resonating direction different from a polarization direction of a radio wave transmitted and received by the antenna unit.

2. The antenna apparatus according to claim 1, wherein the plurality of conductor patterns are structured such that a phase lag of a reflected wave increases with increasing distance from a center of the antenna unit in the resonating direction from the center of the antenna unit.

3. The antenna apparatus according to claim 2, wherein each of the plurality of conductor patterns includes a plurality of conductor patches each having a rectangle shape, and the plurality of conductor patches are arranged such that a side of the rectangle is inclined at a same inclination angle to the polarization direction and are structured such that, at the operating frequency, the resonating direction of the conductor patches is a direction along at least one side of the rectangle.

4. The antenna apparatus according to claim 3, wherein each of the plurality of conductor patches are structured in which, at the operating frequency, 2 directions along two adjacent sides of the rectangle is given as a resonating direction.

5. The antenna apparatus according to claim 3, wherein the plurality of conductor patches are formed of a plurality of blocks arranged along the resonating direction, and are structured such that, for respective reflected waves from the plurality of blocks, each block has a different phase at the operating frequency and such that, for each set of adjacent blocks, a difference in the phase of the reflected wave between the adjacent blocks is constant.

6. The antenna apparatus according to claim 3, wherein the plurality of conductor patches form a plurality of blocks arranged along the resonating direction, and are structured such that, for respective reflected waves from the plurality of blocks, each block has a different phase at the operating frequency, and the difference in the phase of the reflected wave between the adjacent blocks increases with the increasing distance from the center of the antenna unit.

7. The antenna apparatus according to claim 2, wherein each of the plurality of conductor patterns includes conductor patches each shaped like a rectangle with at least one corner thereof cut out.

8. The antenna apparatus according to claim 7, wherein the plurality of conductor patterns have a circular polarization characteristic based on the cutout shape.

9. The antenna apparatus according to claim 7, wherein the reflecting unit includes a plurality of areas, and the plurality of conductor patterns are structured such that at least one of a position where the cutout shape is formed and an amount of cutout is different, for each of the plurality of areas.

10. The antenna apparatus according to claim 3, wherein the plurality of conductor patches have the phase of the reflected wave adjusted by changing the size of the conductor patch, along the resonating direction.

11. The antenna apparatus according to claim 10, wherein the plurality of conductor patches have a length of a side of the rectangle changed along directions of each two adjacent sides of the rectangle to adjust the phase of the reflected wave, in four directions centered around the antenna unit.

12. The antenna apparatus according to claim 3, wherein the plurality of conductor patches have a changing interval between the conductor patches, in the resonating direction, to adjust the phase of the reflected wave.

13. The antenna apparatus according to claim 1, wherein an angle between the polarization direction of the radio wave and the resonating direction is 45 degrees.

14. The antenna apparatus according to claim 1, wherein each of the plurality of conductor patterns has a size smaller than or equal to three-quarters of the effective wavelength at the operating frequency.

15. The antenna apparatus according to claim 4, wherein the plurality of conductor patches are formed of a plurality of blocks arranged along the resonating direction, and are structured such that, for respective reflected waves from the plurality of blocks, each block has a different phase at the operating frequency and such that, for each set of adjacent blocks, a difference in the phase of the reflected wave between the adjacent blocks is constant.

16. The antenna apparatus according to claim 4, wherein the plurality of conductor patches form a plurality of blocks arranged along the resonating direction, and are structured such that, for respective reflected waves from the plurality of blocks, each block has a different phase at the operating frequency, and the difference in the phase of the reflected wave between the adjacent blocks increases with the increasing distance from the center of the antenna unit.

17. The antenna apparatus according to claim 8, wherein the reflecting unit includes a plurality of areas, and the plurality of conductor patterns are structured such that at least one of a position where the cutout shape is formed and an amount of cutout is different, for each of the plurality of areas.

18. The antenna apparatus according to claim 4, wherein the plurality of conductor patches have the phase of the reflected wave adjusted by changing the size of the conductor patch, along the resonating direction.

19. The antenna apparatus according to claim 4, wherein the plurality of conductor patches have a changing interval between the conductor patches, in the resonating direction, to adjust the phase of the reflected wave.

20. The antenna apparatus according to claim 2, wherein an angle between the polarization direction of the radio wave and the resonating direction is 45 degrees.

* * * * *